Oct. 24, 1967
W. L. KRAYER
3,348,771
FORCE BALANCE COMPUTING APPARATUS
Filed July 13, 1965
4 Sheets-Sheet 1
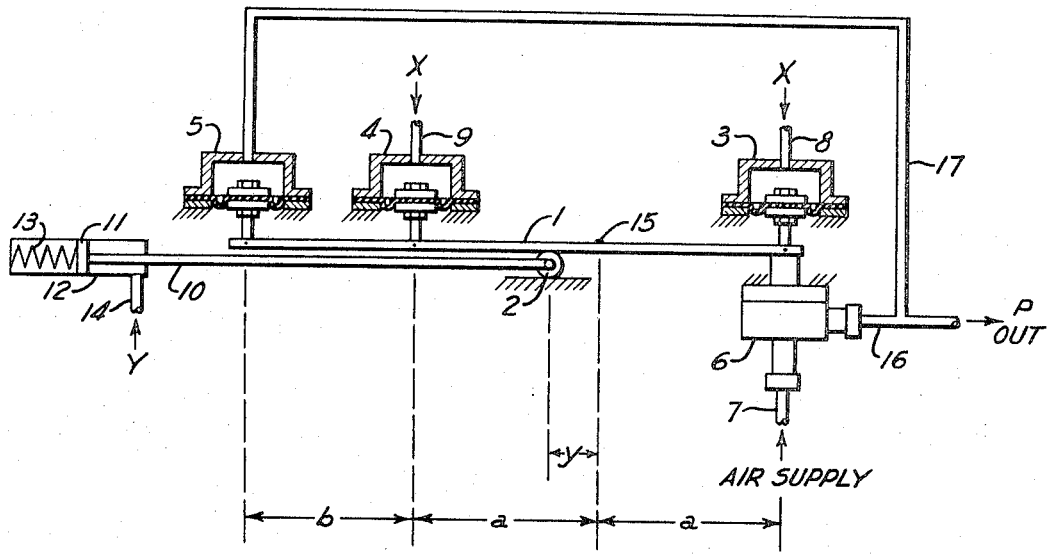
Fig. 1  $p = XY \cdot \dfrac{2}{2a+b}$
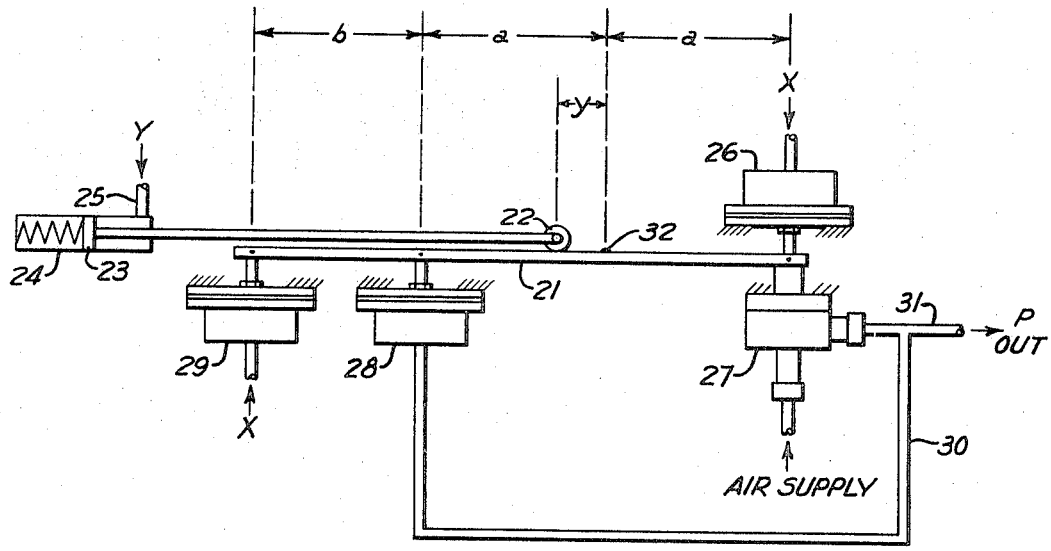
Fig. 2  $p = \dfrac{X}{Y} \cdot \dfrac{2a+b}{2}$
INVENTOR.
WILLIAM L. KRAYER.

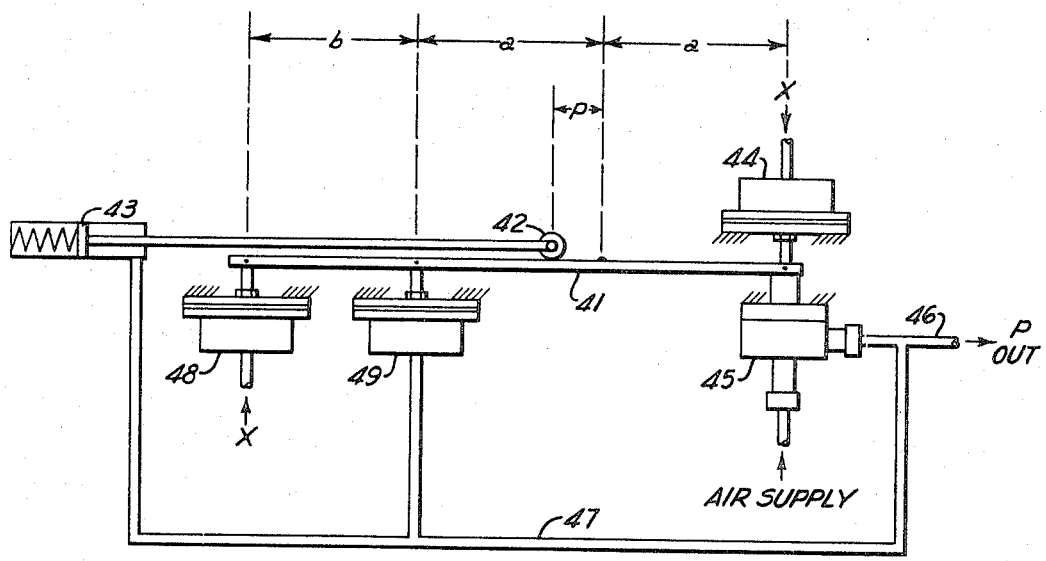
Fig.3  $P = \sqrt{X} \cdot \sqrt{\frac{2a+b}{2}}$
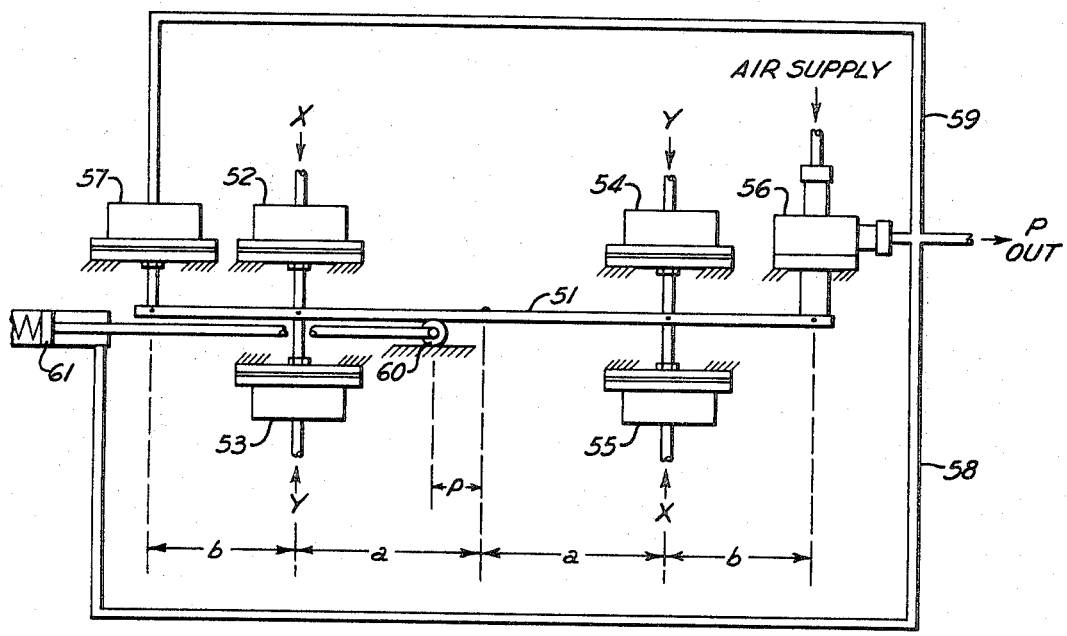
Fig.4  $P = \sqrt{X-Y} \cdot (\sqrt{a})$

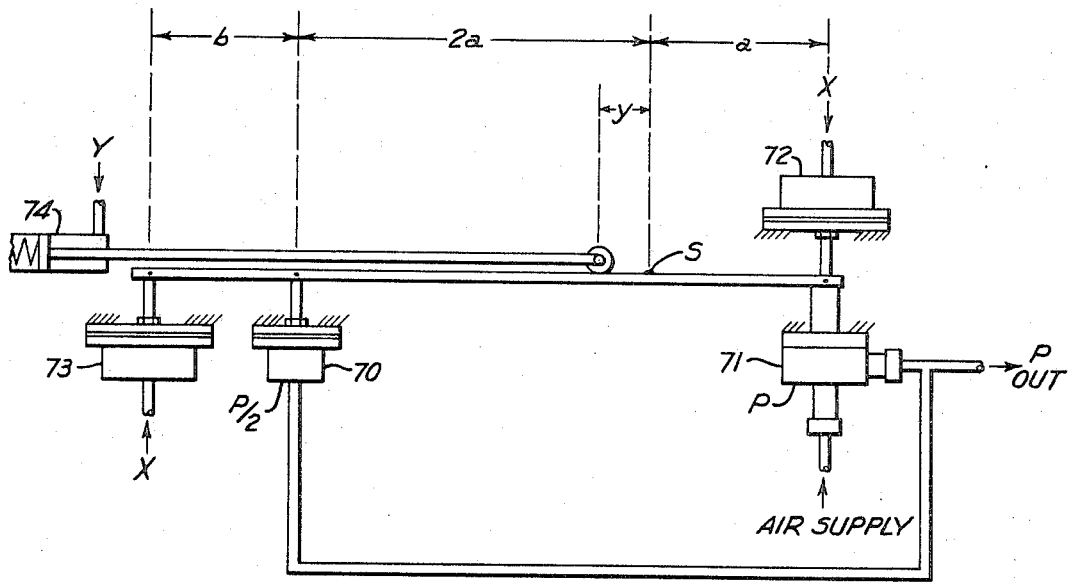
Fig. 5    $p = \frac{X}{Y} \cdot \frac{2(3a+b)}{3}$
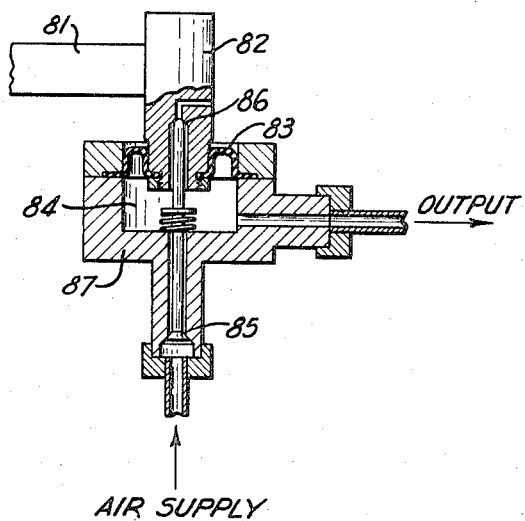
Fig. 6

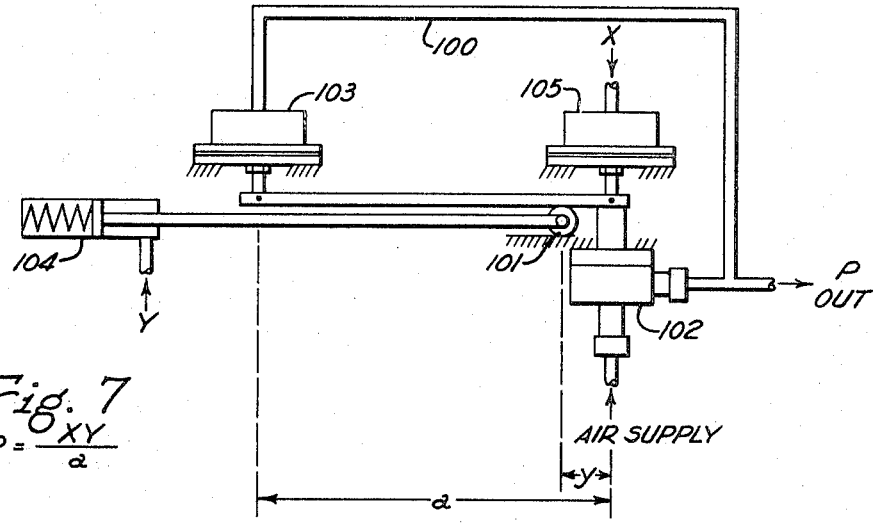
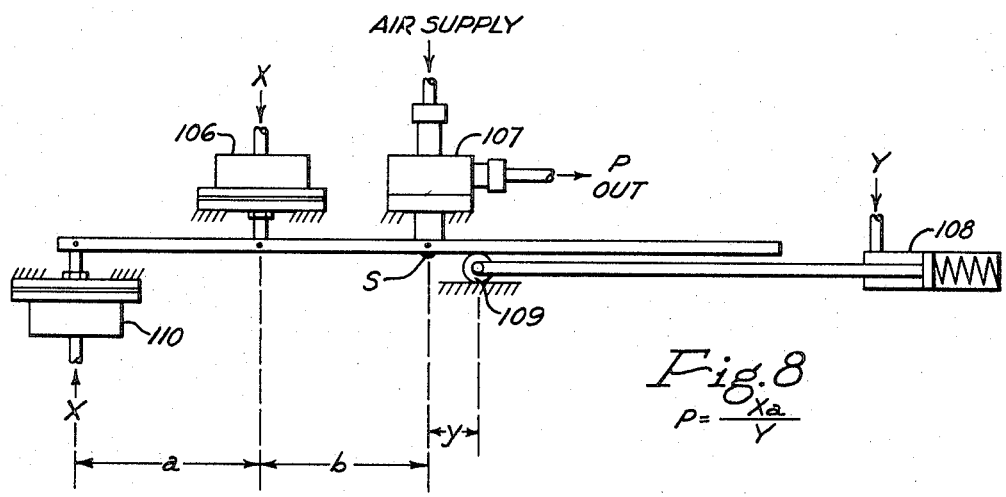
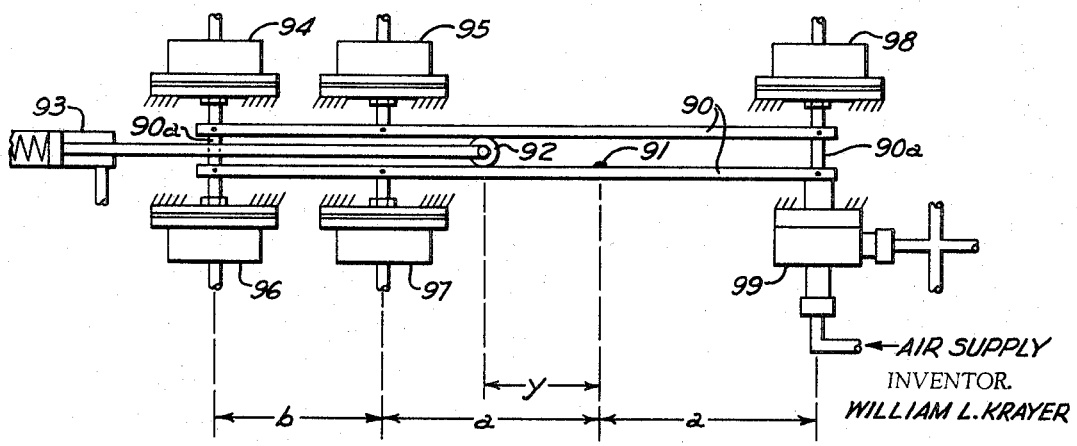

United States Patent Office 3,348,771
Patented Oct. 24, 1967

3,348,771
FORCE BALANCE COMPUTING APPARATUS
William L. Krayer, Pittsburgh, Pa., assignor to Calgon Corporation, Pittsburgh, Pa.
Filed July 13, 1965, Ser. No. 471,698
15 Claims. (Cl. 235—200)

This invention relates to analog computing apparatus. In particular, it relates to force-balance mechanism for generating pneumatic output signals as functions of two or more variable input signals.

Force balance devices have long been used in the control art to perform addition and subtraction of variables, and multiplication and division of a single variable by a constant. The typical force balance device which performs these functions has not, however, been capable of multiplying or dividing two variable input signals.

Sorteberg, in his U.S. Patents 2,643,055; 2,918,214; and 3,085,744 describes perhaps the most widely used mechanism for multiplying and dividing variable pneumatic signals. This device has the disadvantage, however, of a loss of accuracy when the fulcrum is near one end or the other of the beam. Moreover, it requires the use of two beams and a double-acting fulcrum.

Several other patents may be considered among the pertinent publications of the prior art. Luhrs U.S. Patent 2,217,642 shows the use of means for moving a force applying device on a force balance beam as applied particularly to density measurements of flowing fluids. Newell U.S. Patent 2,317,293 discloses a hydraulic computer having an adjustable fulcrum not responsive to an analog value. Berges U.S. Patent 2,394,284 employs a stationary fulcrum and achieves ratioing. Brown U.S. Patent 2,507,498 utilizes a movable fulcrum but requires also a logarithmic cam edge on the beam. Stough U.S. Patent 2,841,162 discloses a complex apparatus which does not utilize a movable fulcrum. Frantz U.S. Patent 2,910,084 generates a nonlinear function of one or more input pressures by moving a pivot. The following U.S. Patents may also be of interest to the reader: Morris 2,967,537; Martz et al. 2,992,559; Vesper 3,059,846; Rohmann et al. 3,072,326; Bowditch 3,086,702; Lupber 3,104,810; and Ollivier 3,165,262.

I have invented a force-balance device which is simpler, requires fewer parts, and which may be built to achieve accuracy over a greater range than force-balance computers heretofore known. My invention is illustrated in several presently preferred forms in the accompanying drawings.

FIG. 1 is a presently preferred form of my invention in which the output is proportional to the product of two variables X and Y.

FIG. 2 is a presently preferred form of my invention in which the output is proportional to a variable input X divided by a variable input Y.

FIG. 3 illustrates square root extraction of a variable with my apparatus.

FIG. 4 shows the apparatus arranged to function as a flow meter.

FIG. 5 is a variation of the division-performing device showing the use of different arm lengths.

FIG. 6 is a detailed illustration of a preferred pneumatic force balance signal generating device used in the previous figures.

FIG. 7 is a further variation of the multiplying configuration using only three force-applying devices.

FIG. 8 is a further variation of the dividing configuration using only three force-applying devices.

FIG. 9 is a more or less diagrammatic illustration of a versatile variation of my invention capable of performing any of the above functions.

In FIG. 1, beam 1 is mounted on movable fulcrum 2. Four force-applying devices 3, 4, 5 and 6 are disposed to apply forces to beam 1 at the points shown. Devices 3, 4 and 5 are dead-end pneumatic diaphragm chambers such as are known in the automatic control art, being connected to pneumatic pressure input conduits 8, 9 and 17 respectively. Unless otherwise stated, it may be assumed that the diaphragm areas are equal in all discussions throughout this specification. Device 6 is a pneumatic force-balance device, also known in the art, illustrated in detail in FIG. 6. It includes a conduit 7 for introducing a constant air supply, and means shown in FIG. 6 for generating a pressure force equal and opposed to any downward force on it. This pressure is transmitted as the output P through conduit 16. It will be noted that the output is fed back through conduit 17 to pressure-responsive force-applying device 5. Fulcrum 2, illustrated in the form of a roller, is attached by arm 10 to piston 11 in air cylinder 12. Piston 11 is urged to the right by spring 13, while the area to the right of piston 11 is filled with air introduced at a variable pressure Y through conduit 14. The distance $y$ moved by fulcrum 2 from its origin 15 is proportional to the variable input pressure Y. When the areas of the diaphragms in chambers 3, 4, 5 and 6 are equal, the distances $a$, $b$ and $y$ are as shown, and a variable pressure X is introduced to chamber 3 and 4, the apparatus at equilibrium may be expressed as follows:

$$P(b+a-y)+x(a-y)=(x-P)(a+y)$$

$$P=xy\left(\frac{2}{2a+b}\right)$$

Since the quantity $$\frac{2}{2a+b}$$

is a constant, the pressure P is a linear function of $xy$.

In FIG. 2, pressure-responsive, force-applying devices 26, 27, 28 and 29 are disposed as shown on beam 21 to apply forces thereto resulting in variable moments around fulcrum 22. Fulcrum 22 is moved to the left a distance $y$ proportional to variable input Y introduced through conduit 25 to pneumatic cylinder 24 having a piston 23 connected to fulcrum 22. A variable analog signal in the form of a pneumatic pressure X is introduced to devices 26 and 29. Device 27 is a force-balance pneumatic pressure generating device such as illustrated in FIG. 6. Its output is sent through conduit 30 to device 28 where it urges beam 21 clockwise. The output pressure may also be transmitted through conduit 31 to be utilized in a positioner, controller, recorder, or the like. When in equilibrium, the balance of forces may be expressed:

$$x(b+a-y)+P(a-y)=(P-x)(a+y)$$

$$P=\frac{x}{y}\cdot\frac{2a+b}{2}$$

FIG. 3 is an illustration of a third variation in which the output of force-balance pneumatic pressure generating device 45 is returned through conduit 47 to both force-applying device 49 and pneumatic cylinder 43, whereby the output P is proportional to the square root of a variable pressure X introduced to both devices 44 and 48.

In this figure, the distance which fulcrum 42 is moved on beam 41 is also represented by P, whereby the output pressure $$P=\sqrt{X}\cdot\sqrt{\frac{2a+b}{2}}$$

In FIG. 4, the square root extracting configuration of FIG. 3 is adapted to serve as a flowmeter in which the input X is the pressure upstream of an orifice and the input Y is the presence downstream thereof. Pressure X is introduced to chambers 52 and 55, and pressure Y is introduced to chambers 53 and 54, while the output from signal generator 56 is sent through lines 58 and 59 to the fulcrum mover 61 and chamber 57. The fulcrum 60 having moved a distance P on beam, 51, the equilibrium of moments may be expressed:

$$P(b+a-P)+(x-y)(a-P)$$
$$=P(b+a+P)+(y-x)(a+P)$$
$$P=\sqrt{x-y}\cdot\sqrt{a}$$

P thus expresses the rate of flow as a linear function of the constant $\sqrt{a}$.

FIG. 5 illustrates that the distance relationships are not restricted to those shown in the previous figures. In this case, the origin S of the fulcrum is not in the center of the beam. The force-applying device 70 receiving the output P has a diaphragm area only half that of the signal generator 71.

At equilibrium, the moments may be expressed as follows:

$$(P-x)(a+y)=\frac{P}{2}(2a-y)+x(2a+b-y)$$

$$P=\frac{x}{y}\cdot\frac{2(3a+b)}{3}$$

If the maximum fulcrum movement, corresponding to the maximum pressure of Y, is $$\frac{2(3a+b)}{3}$$

then the maximum output signal P will be the maximum of the range of X. This principle holds true for any of the constants shown in the formulas on the drawings.

FIG. 6 is a sectional view of the signal generator used in the foregoing illustrations. Support 82 is attached to beam 81. A downward force on support 82 tends to open poppet valve 85, since flexible diaphragm 83 is the only connection between support 82 and the signal generator housing 87. The air supply is permitted by the poppet valve to enter chamber 84, where its pressure exerts an upward force on diaphragm 83 which urges support 82 upward, tending to close the poppet valve at 85 and open it to exhaust at 86. The poppet valve thus achieves a balance when the pressure in chamber 84 is equivalent to the downward force on beam 81 and support 82. The pressure in chamber 84 is transmitted as the output of the device. The signal generator described in FIG. 6 is more completely described in Bulletin MYP-120 of the manufacturer, Hagan Controls Corporation. The same bulletin also describes the well-known diaphragm chambers utilized throughout this specification to exert forces on the beams.

FIG. 7 demonstrates multiplication of variables X and Y using only a single input chamber for X. In this variation, fulcrum 101 is moved a distance y from the right end of the beam in proportion to the variable input pressure Y, by means of cylinder 104 in the same manner previously described. The output P is transmitted from generator 102 through conduit 100 to force-applying diaphragm device 103. At equilibrium, the function of the apparatus may be expressed:

$$P(a-y)=y(x-P)$$
$$P=xy/a$$

In FIG. 8, fulcrum 109 is moved a distance y from its origin S by cylinder 108 in response to a variable pressure Y. Variable pressure X is introduced to force-applying chambers 110 and 106 at distances $(a+b)$ and $b$ from origin S. In contrast to the other configurations, the output P is not fed back. The balance of forces may be expressed:

$$x(a+b+y)=x(b+y)+Py$$
$$P=xa/y$$

FIG. 9 illustrates a different variation having more versatility than any of the above forms, in that it may be used to perform multiplication, division, square root, and square. Dead-end diaphragm pneumatic force-applying devices 94, 95, 96, 97 and 98 are located on a double beam 90 in a relationship to fulcrum origin 91 as shown. Supports 90a serve to connect the double beam. Signal generating device 99 performs the same function as in the previous illustrations, i.e. it generates a pneumatic pressure proportional to a downward force acting upon it. Fulcrum 92 is moved to the left a distance y proportional to a variable pressure in cylinder 93. The double beam is not essential, but is used for convenience of construction. It will be noted that, by connecting the output of device 99 to the appropriate diaphragm chamber corresponding to the one utilized in FIGS. 1, 2 or 3, any of the mathematical functions described in connection with those figures may be performed with the device of FIG. 9.

Taking the pertinent definition of a lever arm to be the distance between the fulcrum and the point of application of a force on the beam, and the definition of a couple as two equal and opposite forces acting upon the beam, the lines of action of which are parallel but which do not coincide, it may be seen that in all variations of my invention I have balanced a force acting on a variable lever arm against a force acting as a couple. The movement of the fulcrum varies the lever arm distance, but has no effect on the couple. The distance between the two points of force application of the couple is unchanged. With my device it is possible to change the lever arm of one factor without affecting the lever arm of any other force.

For example, in FIG. 1, the moments of $x(a-y)$ and $x(a+y)$ have the algebraic sum $2Xy$. Opposed to this resulting moment is the couple $P(a+b-y)$ and $P(a+y)$, which has the algebraic sum $P(2a+b)$, the product of a variable and a constant. Note that the constant factor in the couple, $(2a+b)$, represents the constant distance, which is not changed by movement of the fulcrum, between the two points of force application of the couple.

The force-applying devices need not always be disposed linearly on the beam. Where two additive forces are applied on the same portion of the beam, for example, they may be added by other known techniques, such as by means of a ratio totalizer separate from the main apparatus, and the output of the totalizer introduced to a single diaphragm device on the computer, or the two force-applying devices may be placed side by side on a crossbar perpendicular to the computer beam, etc. More than the number shown may be used. For purposes of this disclosure, two force-applying devices on the same portion of the beam at different distances from the fulcrum, or opposed and at the same distances but different diaphragm areas, etc. may be considered a single force-applying device if the effect is the same.

The useful methods of applying the various forces to the beam are not restricted to fluid pressure. Any of the forces may derive from springs, mechanical linkages, direct transmission of pressure, etc.; however, I prefer to employ fluid pressure, and particularly pneumatic pressure signals such as are widely used for industrial automatic control, at least for the output signal generator. Pneumatic pressure signals are usually applied with diaphragm chambers or bellows, as is known in the art. It will be seen that my invention encompasses a method of computing with analog values including the steps, not necessarily sequential, of moving a movable fulcrum from an origin on a beam a distance $y$ in relation to said beam as a function of a variable analog value Y, applying one or more forces to said beam such that the algebraic sum of the moments thereof, before and after movement of the fulcrum, is proportional to the product of Y and a variable force X, and balancing said beam by applying a force P to two points on said beam such that the algebraic sum of the moments thereof, before and after movement of the fulcrum, is equal and opposite to the moment of X$y$, whereby P is a function of XY.

It will be noted that the illustrations require the fulcrum to be moved in a particular direction in each case. However, the mathematical relationship stated for the apparatus may be adhered to when the fulcrum is moved in the opposite direction by substituting negative values for the output pressure force. That is, in the case of FIG. 1, for example, if cylinder 12 were reversed to move the fulcrum to the right on application of pressure Y, output P must be a negative pressure, which may be accomplished by applying it to the other side of the lever arm in each case. Chambers 5 and 6 may be positioned opposite their illustrated sites and the necessary balance of moments will satisfy the equation to make $$P = xy \cdot \frac{2}{2a+b}$$

It may be necessary to put the fulcrum on the opposite side of the beam.

The fulcrum need not be a roller but may be any type of fulcrum movable in relative to the beam. Of course, it must have a base from which to operate, but need not be of the type which must be on one side or the other of the beam. It can, for example, be a flexure type or otherwise physically attached to the beam to operate whether the total forces are bearing on it or pushing away from it.

Y may cause the fulcrum to move according to functions other than direct proportion. For example, the use of a cam and linkage in a known manner may cause the fulcrum to move a distance proportional to $Y^2$ when Y is a pneumatic pressure introduced to the device. My device will function exactly the same, however, resulting in the substitution of $y^2$ for $y$ in the above stated equations. The output of the multiplying configuration, for example, is still a function of XY. Likewise, the other variable input X may be externally changed according to other desired functions, without altering the performance of my apparatus.

It will also be seen from FIGS. 1 thru 5 that where two force-applying devices are used to result in a moment which is the product of two variables ($xy$ or $yP$, for example), the two devices are equidistant from the origin of the fulcrum except where a diaphragm area of different size is used (FIG. 5) so that the algebraic sum of the moments is reduced to the product of the variable and $y$. It will be apparent that the result of FIG. 5 can be accomplished in other ways, i.e. by using a diaphragm of standard size and dividing the output P by 2 in a relay before introducing it to the diaphragm chamber.

Of course, the mechanism for moving the fulcrum may be located on the beam rather than the fulcrum. Any beam and fulcrum which are relatively movable, including apparatus for applying different fulcrums at different points, are within the contemplation of my invention. Any means for applying a fulcrum to different points on the beam as a predetermined function of a variable analog signal, including an electrical signal, etc. is within the scope of my invention.

I do not intend to be restricted to the above described specific illustrations of my invention. It may be otherwise variously utilized within the scope of the following claims.

I claim:
1. Force balance computing apparatus comprising
   (a) a beam
   (b) means for continuously applying a force to said beam in proportion to a variable pneumatic pressure
   (c) means for varying the length of a lever arm on said beam for said force applying means as a function of a variable pneumatic pressure, and
   (d) means for applying two equal forces as a couple in opposition to said lever arm.
2. Apparatus of claim 1 in which (c) is a fulcrum movable relative to said beam in response to a pneumatic analog pressure signal.
3. Force balance computing apparatus comprising
   (a) a beam
   (b) a fulcrum therefor
   (c) means for moving said fulcrum in relation to said beam as a function of an analog signal
   (d) means for applying two forces to said beam as a couple
   (e) means for applying a force to said beam to oppose the couple.
4. Apparatus of claim 3 in which means (e) and said fulcrum define a lever arm on the beam determined solely by movement of the fulcrum.
5. Apparatus of claim 3 in which means (e) and said fulcrum define a lever arm on said beam directly proportional to the analog signal acting upon element (c).
6. Apparatus of claim 3 in which element (c) is a pneumatic cylinder.
7. Apparatus of claim 3 in which elements (d) and (e) are pneumatic force-applying devices.
8. Pneumatic force balance computing apparatus comprising
   (a) a beam
   (b) a fulcrum therefor
   (c) means for moving said fulcrum in relation to said beam in response to a pneumatic analog signal
   (d) means for applying two equal forces to said beam as a couple in response to a pneumatic pressure signal, and
   (e) means for applying a force to said beam to oppose the couple in response to a pneumatic pressure signal.
9. Apparatus of claim 8 in which element (d) includes a device for generating a pressure signal in response to a force acting upon it.
10. Apparatus of claim 8 in which element (e) includes a device for generating a pressure signal in response to a force acting upon it.
11. Apparatus of claim 8 in which element (e) comprises two pneumatic force-applying devices.
12. Pneumatic force balance analog multiplying apparatus comprising:
    (a) a beam
    (b) means for applying a force to said beam in proportion to a first pneumatic analog signal
    (c) means for varying the length of a lever arm on said beam for said force applying means in response to a second pneumatic analog signal, and
    (d) means for applying two forces to said beam as a couple to balance the moment generated through said lever arm.
13. Apparatus of claim 12 in which element (d) includes a device for generating a pneumatic output signal proportional to a force acting upon it.
14. Pneumatic force balance analog dividing apparatus comprising:
    (a) a beam
    (b) means for applying two equal forces to said beam as a couple in proportion to a first pneumatic analog signal
    (c) means for varying the length of a lever arm on said beam in proportion to a second pneumatic analog signal, and
    (d) means for applying a force through said lever arm to balance said beam.
15. Apparatus of claim 14 in which element (d) in- cludes a device for generating a pneumatic output signal proportional to a force acting upon it.

References Cited

UNITED STATES PATENTS

| | | | |
|---|---|---|---|
| 2,317,293 | 4/1943 | Newell | 235—200 |
| 2,394,284 | 2/1946 | Berges | 235—200 X |
| 2,507,498 | 5/1950 | Brown | 235—200 X |
| 2,521,477 | 9/1950 | Pellettere | 235—200 X |
| 2,910,084 | 10/1959 | Frantz | 235—200 X |
| 3,072,326 | 1/1963 | Rohmann et al. | 235—200 |
| 3,079,074 | 2/1963 | Jordon | 235—200 |
| 3,165,262 | 1/1965 | Ollivier | 235—200 |
| 3,239,139 | 3/1966 | Chapin et al. | 235—200 |

FOREIGN PATENTS

| | | |
|---|---|---|
| 860,485 | 2/1961 | Great Britain. |

RICHARD B. WILKINSON, *Primary Examiner.*

LOUIS J. CAPOZI, *Examiner.*

W. F. BAUER, L. R. FRANKLIN, *Assistant Examiners.*